(12) United States Patent
Hashimoto et al.

(10) Patent No.: US 7,641,966 B2
(45) Date of Patent: Jan. 5, 2010

(54) RE-RELEASE ADHESIVE AND RE-RELEASE ADHESIVE SHEET

(75) Inventors: Kouichi Hashimoto, Osaka (JP); Takahiro Fukuoka, Osaka (JP); Koji Akazawa, Osaka (JP); Yoshio Nakagawa, Osaka (JP); Tatsuya Kubozono, Osaka (JP)

(73) Assignee: Nitto Denko Corporation, Osaka (JP)

( * ) Notice: Subject to any disclaimer, the term of this patent is extended or adjusted under 35 U.S.C. 154(b) by 1195 days.

(21) Appl. No.: 10/013,543

(22) Filed: Dec. 13, 2001

(65) Prior Publication Data

US 2002/0091173 A1    Jul. 11, 2002

Related U.S. Application Data

(63) Continuation-in-part of application No. 09/592,990, filed on Jun. 13, 2000.

(30) Foreign Application Priority Data

Jun. 14, 1999    (JP) .................... 11-167553

(51) Int. Cl.
*B32B 7/12* (2006.01)
*C08G 18/00* (2006.01)

(52) U.S. Cl. .................. 428/345; 522/96; 428/355 RA; 428/355 N

(58) Field of Classification Search ................ 522/150, 522/152, 153, 121, 114, 117, 119, 96, 116; 428/41.3, 41.5, 41.8, 343, 345, 355 RA, 355 EN, 428/355 CN, 355 AC, 355 N
See application file for complete search history.

(56) References Cited

U.S. PATENT DOCUMENTS

| | | |
|---|---|---|
| 4,288,479 A | 9/1981 | Brack |
| 4,695,608 A | 9/1987 | Engler et al. |
| 5,149,586 A | 9/1992 | Ishiwata et al. |
| 5,281,473 A | 1/1994 | Ishiwata et al. |
| 5,741,543 A * | 4/1998 | Winslow et al. .......... 427/208.4 |

(Continued)

FOREIGN PATENT DOCUMENTS

EP        0 298 448 A2    1/1989

(Continued)

OTHER PUBLICATIONS

Patent Abstracts of Japan—JP-9-298173 (1998).

*Primary Examiner*—Susan W Berman
(74) *Attorney, Agent, or Firm*—Sughrue Mion, PLLC

(57) ABSTRACT

A curable re-release adhesive which, when subjected to a curing reaction caused by irradiation with radiation, shows a sufficient drop of adhesion and causes the adherend to be warped to a minimized extent as developed by the shrinkage force caused by the curing reaction. The re-release adhesive contains a radiation-reactive polymer including a main chain and a plurality of intramolecular side chains, each such side chain having a terminal carbon-carbon double bond, a chain length of 6 or more in terms of number of atoms, and the same or a different number of atoms as each other side chain in the polymer. The release adhesive shows a shrinkage force of 30 MPa or less as developed by a curing reaction upon irradiation. A re-release adhesive sheet is also disclosed, including a substrate film and an adhesive layer containing the re-release adhesive, provided on one surface thereof.

5 Claims, 1 Drawing Sheet

U.S. PATENT DOCUMENTS

| | | | |
|---|---|---|---|
| 6,465,330 B1 * | 10/2002 | Takahashi et al. | 438/464 |
| 6,605,345 B2 * | 8/2003 | Kanai et al. | 428/345 |
| 6,723,619 B2 * | 4/2004 | Nagamoto et al. | 438/459 |
| 7,060,339 B2 * | 6/2006 | Matsumura et al. | 428/66.6 |
| 7,309,925 B2 * | 12/2007 | Matsumura et al. | 257/797 |

FOREIGN PATENT DOCUMENTS

| | | |
|---|---|---|
| JP | 05-043857 A | 2/1993 |
| JP | 05-247410 A | 9/1993 |
| JP | 07-113068 A | 5/1995 |
| JP | 08-027239 A | 1/1996 |

* cited by examiner

RADIATION

RE-RELEASE ADHESIVE AND RE-RELEASE ADHESIVE SHEET

CROSS-REFERENCE TO RELATED APPLICATIONS

This application is a continuation-in-part of application Ser. No. 09/592,990 filed Jun. 13, 2000, the entire contents of which are incorporated herein by reference.

FIELD OF THE INVENTION

The present invention relates to a re-release adhesive which can be used as a protective sheet for protecting the surface of a semiconductor wafer at the grinding step of grinding the back surface of the wafer among various steps for the preparation of semiconductor, or as a dicing adhesive tape for sticking to the back surface of a wafer at the pick-up dicing step of automatically collecting element chips obtained by cutting and separating a semiconductor wafer, and a re-release adhesive to be used as an adhesive layer of the re-release adhesive sheet.

BACKGROUND OF THE INVENTION

In recent years, there has been a growing tendency toward the increase of the size of semiconductor wafer and the reduction of the thickness of wafer for IC card. In order to satisfy the requirements for ease of peeling the protective tape for working the wafer, there have been used more radiation-curing protective sheets. The radiation-curing protective sheet can be easily peeled but is disadvantageous in that when irradiated with radiation, the adhesive itself undergoes shrinkage to produce a shrinkage force that causes the wafer to be warped, making it difficult for the wafer to be conveyed at the production process.

The radiation-curing protective sheet also gives a problem at so-called dicing step for picking up semiconductor elements which have been cut and separated. In other words, when an adhesive sheet made of an adhesive which is liable to great volume shrinkage is used, the sheet cannot be sufficiently expanded, making it impossible to expand the dicing street and hence causing troubles in picking up the semiconductor elements.

In general, a radiation-curing adhesive is prepared by using a high molecular weight compound called base polymer (main polymer), a radiation-polymerizable compound (radiation-reactive oligomer, etc.) having a weight-average molecular weight of 20,000 or less and a carbon-carbon double bond in its molecule and a radiation polymerization initiator as essential components, and appropriately added various additives such as crosslinking agent thereto. In order to provide the adhesive with characteristics that the adhesion is greatly lowered after irradiation with radiation, a so-called polyfunctional compound having two or more carbon-carbon double bonds per molecule is widely used as the radiation-polymerizable compound. When such a radiation-curing adhesive is irradiated with radiation, the radiation-polymerizable compound undergoes reaction to form a three-dimensional network structure rapidly, causing the entire adhesive to react and harden rapidly and show a drop of adhesion. These techniques are disclosed in, for example, JP-A-5-32946 (The term "JP-A" as used herein means an "unexamined published Japanese patent application"), JP-A-8-20756, JP-A-9-186121, JP-A-9-298173 and JP-A-11-26406. However, this reaction/curing is accompanied by great volume shrinkage of the adhesive that causes the development of shrinkage stress resulting in the above-described disadvantages.

It can be proposed that a radiation-polymerizable compound having as few functional groups as possible be used to overcome these disadvantages. However, this approach is disadvantageous in that the resulting adhesive cannot show a sufficient drop of adhesion after irradiation with radiation and thus loses inherent performances of an adhesive.

The following method is proposed as a method for reducing the shrinkage force developed by curing reaction caused by irradiation with radiation: a method of decreasing the amount of the radiation-reactive oligomer to the main polymer; specifically, a method which comprises mixing about 10 to 40 parts by weight of the radiation-reactive oligomer with 100 parts by weight of the main polymer. In this method, it is proper that an oligomer which allows sufficient drop of adhesion even when used in a small amount, e.g., polyfunctional oligomer having 6 or more unsaturated bonds, be selected. In order to maintain a desired adhesion before irradiation with radiation, it is preferred that an acrylic acid ester copolymer having a low elastic modulus be selected as a main polymer. Another possible method for reducing the shrinkage force is a method which involves the selection of a compound having 1 to 4 unsaturated bonds per molecule which undergoes low shrinkage as a radiation-reactive oligomer while mixing about 30 to 300 parts by weight of the radiation-reactive oligomer with 100 parts by weight of the main polymer. In this case, it is preferred that an oligomer which undergoes low shrinkage but shows a reduced adhesion be selected. Further, a method is proposed which comprises mixing a mixture of about 20 to 300 parts by weight of a polyfunctional oligomer having 6 or more unsaturated bonds and a low-functional oligomer having from 1 to 4 unsaturated bonds per molecule with 100 parts by weight of the main polymer.

However, according to the inventors' studies, it has been found difficult in all the above approaches to satisfy both the two requirements for sufficient drop of adhesion and low shrinkage force of adhesive at the same time. One of the reasons for the above difficulty is that complete compatibility is made difficult in such a system having a main polymer and a radiation-reactive oligomer in admixture. In order to accomplish sufficient drop of adhesion, excess amount of oligomer is required. When excess amount of oligomer is used, a high shrinkage force is developed.

SUMMARY OF THE INVENTION

It is therefore an object of the present invention to provide a re-release adhesive and re-release adhesive sheet which, when subjected to curing reaction caused by irradiation with radiation, show a sufficient drop of adhesion and can cause the adherend to be warped to a minimized extent under the application of the resulting shrinkage force.

It is another object of the present invention to provide a re-release adhesive and re-release adhesive sheet which show a sufficient drop of adhesion when subjected to curing reaction caused by irradiation with radiation and can be maintained flexible to an extent such that it can be somewhat expanded even after curing.

These and other objects of the present invention will become apparent from the following detailed description and examples.

As a result of extensive studies to overcome the above problems, it was found that when the shrinkage force developed by curing reaction of an adhesive mainly comprising a radiation-reactive polymer having a plurality of intramolecular side chains as defined herein is maintained falling within a predetermined range, the adhesion can be sufficiently lowered when irradiated with radiation and the warpage of the adherend can be prevented. The present invention has been completed based on this finding.

The present invention provides a curable re-release adhesive comprising as a main component a radiation-reactive polymer comprising a main chain and a plurality of intramolecular side chains, each said side chain having a terminal carbon-carbon double bond, a chain length of 6 or more in terms of number of atoms, and the same or a different number of atoms as each other side chain in the polymer; and said re-release adhesive having a shrinkage force of 30 MPa or less as developed upon curing with radiation.

The curable re-release adhesive may further comprise a radiation-reactive oligomer incorporated therein in an amount of from 0.1 to 150 parts by weight based on 100 parts by weight of the radiation-reactive polymer.

It is another object of the present invention to provide a re-release adhesive sheet comprising an adhesive layer comprising a substrate film and the curable re-release adhesive provided on one surface thereof.

The term "shrinkage force" as used herein means the shrinkage force of the radiation-cured adhesive alone measured by means of a cantilever beam (force produced when the adhesive undergoes shrinkage by irradiation with radiation). The shrinkage force is measured by the following method.

As shown in FIG. 1, an adhesive layer B as a sample is adhered to a phosphor bronze plate A (length: 200 mm; width: 20 mm; thickness: 200 μm; JIS C 5210). The plate is then placed horizontally with its length fixed at one end thereof. Thereafter, the sample is irradiated with ultraviolet rays on the adhesive layer B side thereof for 60 seconds (ultraviolet radiator (example): NEL UM-110, produced by Nitto Seiki K.K.), and then returned to ordinary temperature where the vertical displacement δ from the initial position is then measured. The shrinkage force is then calculated from the measurements by the following equations (1 Kg/mm² = 9.8 MPa).

$$\rho = (L^2/8\delta) + \delta/2 = (L^2/8\delta)$$

$$\sigma = (E_1 h_1^3/12 h_2) \times 2/\rho(h_1+h_2) \times \{1 + (h_1/(h_1+h_2)^2/3)\}$$

ρ: Radius of curvature of cantilever (mm)
σ: Internal stress (shrinkage force) (Kg/mm²)
$E_1$: Young's modulus of phosphor bronze plate (Kg/mm²)
$h_1$: Thickness of phosphor bronze plate (mm)
$h_2$: Thickness of adhesive layer (mm)
L/2: Distance between support and point of measurement (mm)
δ: Displacement of specimen (mm)

The term "length of side chain in polymer molecule (chain length)" or "number of atoms" used in connection or a description of side chain as used herein means the number of atoms other than hydrogen such that the number of bonding of these atoms (e.g., atom such as carbon, oxygen and nitrogen or atom which can be bonded to two or more atomic groups) is maximum. For example, the length of an exemplary side chain in a polymer represented by the following formula is 13:

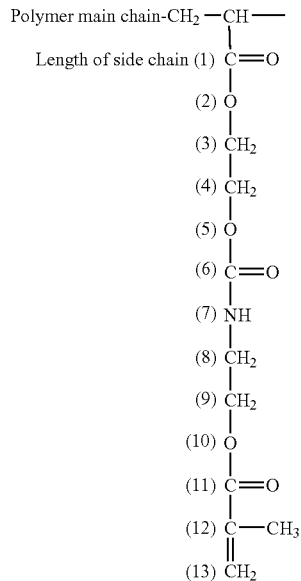

BRIEF DESCRIPTION OF THE DRAWINGS

By way of example and to make the description more clear, reference is made to the accompanying drawings in which.

DETAILED DESCRIPTION OF THE INVENTION

Figure 1:
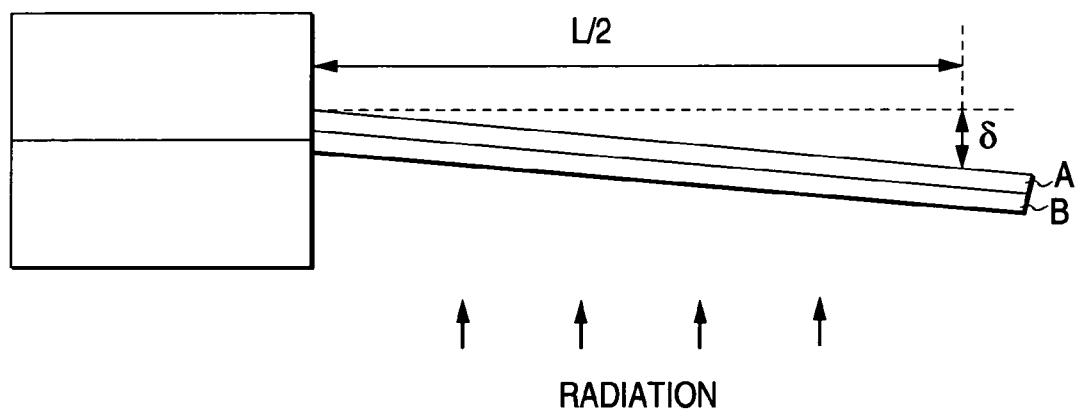
FIG. 1 is a diagram showing a method for measuring the shrinkage force developed by the irradiation of adhesive layer with radiation.
Figure 2:
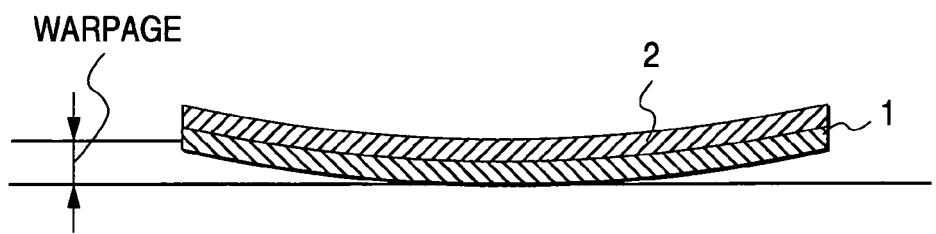
FIG. 2 is a diagram showing a method for measuring the warpage of wafer wherein the symbol A indicates a phosphor bronze plate, the symbol B indicates an adhesive layer, the reference numeral 1 indicates a wafer, and the reference numeral 2 indicates a protective sheet.

The radiation-reactive polymer of the present invention has a plurality of side chains each of which has one terminal carbon-carbon double bond (radiation-reactive double bond), as depicted above, and a chain length of 6 or more (e.g., from about 6 to 30) in terms of the number of atoms as defined above. Also, each side chain can have the same or a different number of atoms from each other side chain, provided of course that each side chain has a chain length of 6 or more. This is demonstrated below:

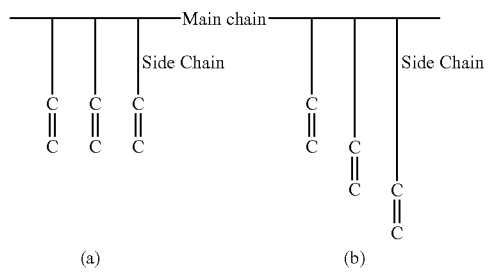

The above sketch (a) shows that all of the side chains have the same number of atoms (same length), whereas sketch (b) shows that the side chains have a different number of atoms (although it would be apparent that even in a polymer of the (b) configuration, some of the side chains may have the same number of atoms). Both (a) and (b) can exhibit the desired effects of the present invention.

Thus, a partial structure of one embodiment of a radiation-reactive polymer suitable for use in the present invention, is shown below:

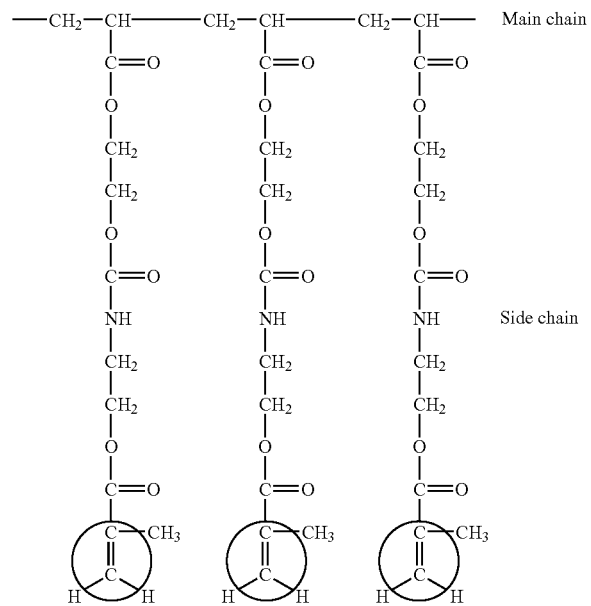

In the foregoing structure, each side chain has the same length, and the terminal carbon-carbon double bonds are circled for clarity.

A material having a carbon-carbon double bond in its polymer molecule has already been known. To date, as its characteristics there have been noted only radiation curing properties. In order to satisfy the requirements for low shrinkage force as well, it is necessary that there be a plurality of side chains each having a chain length of 6 or more in terms of number of atoms and one terminal carbon-carbon double bond in the molecule of the polymer. When the length of the side chains in the polymer molecule falls below 6 in terms of number of atoms, the polymer which has undergone a radiation curing reaction becomes rigid and thus shows a large shrinkage force. Further, when there are two or more carbon-carbon double bonds (number of so-called functional groups in the radiation-reactive polymer) per side chain in the polymer molecule, excess three-dimensional network structure is formed by radiation curing reaction. After curing, the polymer molecule becomes rigid and thus shows a large shrinkage force.

The radiation with which the polymer is irradiated is not specifically limited so far as it can cure the polymer. Examples of the radiation that can be used include X-rays, ultraviolet rays, and electron rays.

The polymer used can be any polymer if it exhibits adhesion. From the standpoint of ease of designing molecule, acrylic polymers are preferred.

The acrylic polymer used can be one containing as monomer components one or more of (meth)acrylic acid alkyl esters (e.g., $C_{1-30}$, particularly $C_{4-18}$ straight-chain or branched alkylester such as methyl ester, ethyl ester, propyl ester, isopropyl ester, butyl ester, isobutyl ester, s-butyl ester, t-butyl ester, pentyl ester, isopentyl ester, hexyl ester, heptyl ester, octyl ester, 2-ethylhexyl ester, isooctyl ester, nonyl ester, isononyl, decyl ester, isodecyl ester, undecyl ester, dodecyl ester, tridecyl ester, tetradecyl ester, hexadecyl ester, octadecyl ester and eicosyl ester) and (meth)acrylic acid cycloalkyl esters (e.g., cyclopentyl ester and cyclohexyl ester).

The acrylic polymer may further comprise as comonomer units other monomers (or oligomers) copolymerizable with the (meth)acrylic acid alkyl ester or cycloalkyl ester incorporated therein as necessary for the purpose of improving the characteristics such as cohesive force and heat resistance. Examples of such monomers (or oligomers) (unit) include carboxyl group-containing monomers such as acrylic acid, methacrylic acid, carboxyethyl acrylate, carboxypentyl acrylate, itaconic acid, maleic acid, fumaric acid and crotonic acid, acid anhydride group-containing monomers such as maleic anhydride and itaconic anhydride, hydroxyl group-containing monomers such as 2-hydroxylethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 1-hydroxydecyl (meth)acrylate, 12-hydroxylauryl (meth)acrylate, (4-hydroxymethylcyclohexyl)methyl acrylate, N-methylol (meth)acrylamide, vinyl alcohol, allyl alcohol, 2-hydroxyethyl vinyl ether, 4-hydroxybutyl vinyl ether and diethylene glycol monovinyl ether, sulfonic acid group-containing monomers such as styrenesulfonic acid, (meth)acrylamidepropanesulfonic acid, sulfopropyl (meth) acrylate and (meth)acryloyloxynaphthalenesulfonic acid, phosphoric acid group-containing monomers such as 2-hydroxyethylacryloyl phosphate, cyano group-containing monomers such as acrylonitrile, amide group-containing monomers such as acrylamide, amino group-containing monomers such as N,N-dimethylaminoethyl (meth)acrylate, epoxy group-containing monomers such as glycidyl (meth) acrylate and allylglycidyl ether, vinyl esters such as vinyl acetate, aromatic vinyl compounds such as styrene, and vinyl ethers such as vinyl ethyl ether. These monomer components may be used alone or in combination of two or more thereof.

The acrylic polymer may further comprise as a copolymerizable monomer component a polyfunctional monomer incorporated therein as necessary for the purpose of crosslinking. Examples of such polyfunctional monomers include hexanediol di(meth)acrylate, (poly)ethyleneglycol di(meth)acrylate, (poly)propyleneglycol di(meth)acrylate, neopentylglycol di(meth)acrylate, pentaerythritol di(meth) acrylate, trimethylolpropane tri(meth)acrylate, pentaerythritol tri(meth)acrylate, dipentaerythritol hexa(meth)acrylate, epoxy acrylate, polyester acrylate, and urethane acrylate. One or more of these polyfunctional monomers may be used. The amount of the polyfunctional monomers to be used is preferably 30% by weight or less based on the total weight of the monomers from the standpoint of adhesion.

The acrylic polymer can be obtained by subjecting a single monomer or a mixture of two or more monomers to polymerization. The polymerization may be carried out by any of solution polymerization, emulsion polymerization, bulk polymerization and suspension polymerization.

The introduction of the side chains as defined herein into such an acrylic polymer can be accomplished by various known methods. From the standpoint of ease of designation of molecule, a method is preferably used which comprises copolymerizing a monomer containing a reactive functional group a (polymerizable compound) with a comonomer to synthesize a polymer having a functional group a in its side chains, and then reacting the polymer with a compound having a functional group b reactive with the functional group a and one carbon-carbon double bond while maintaining the carbon-carbon double bond (condensation, addition reaction, etc.).

Examples of the functional group a and functional group b include carboxyl group, acid anhydride group, hydroxyl group, amino group, epoxy group, isocyanate group and aziridine group. These functional groups may be selectively used in such a combination that they react with each other. Examples of the combination of functional group a and functional group b include combination of carboxyl group and epoxy group, combination of carboxyl group and aziridine group, combination of hydroxyl group and isocyanate group and combination of carboxyl group and hydroxyl group. In these combinations, any of the two components may be a functional group a (or functional group b).

As the compound containing as a functional group a, a monomer having carboxyl group, acid anhydride group, hydroxyl group, amino group or epoxy group, as a functional group b a carboxyl group, acid anhydride group, hydroxyl group, amino group or epoxy group and one carbon-carbon double bond, a compound having a corresponding functional group exemplified as a monomer constituting the acrylic polymer can be used.

Examples of the compound having as a functional group a include a monomer containing an isocyanate group, as a functional group b an isocyanate group and one carbon-carbon double bond include isocyanate compound containing (meth)acryloyl group in its molecule such as methacryloyl isocyanate and 2-methacryloyloxyethyl isocyanate, and isocyanate compound containing vinyl group-containing aromatic ring in its molecule such as m-isopropenyl-$\alpha,\alpha$-dimethylbenzylisocyanate.

Particularly preferred among the above combinations of functional group a and functional group b is combination of hydroxyl group and isocyanate group. For example, a monomer mixture containing as a comonomer component a polymerizable ester compound having a hydroxyl group in its molecule such as (meth)acrylic acid hydroxyalkylester (e.g., 2-hydroxyethyl (meth)acrylate, 2-hydroxypropyl (meth)acrylate, 4-hydroxybutyl (meth)acrylate, 6-hydroxyhexyl (meth)acrylate) or polymerizable ether compound having a hydroxyl group in its molecule such as 2-hydroxyethylvinyl ether, 4-hydroxybutylvinyl ether and diethyleneglycol monovinyl ether may be subjected to polymerization or a monomer mixture containing as a comonomer component a vinyl ester such as vinyl acetate may be subjected to polymerization followed by saponification to synthesize a polymer having side chains containing a hydroxyl group which is then reacted with the isocyanate compound having one carbon-carbon double bond to obtain a radiation-reactive polymer according to the present invention.

Also preferred among the above combinations of functional group a and functional group b is combination of carboxyl group and epoxy group. For example, a monomer mixture containing as a comonomer component a polymerizable unsaturated carboxylic acid such as (meth)acrylic acid may be subjected to polymerization to synthesize a polymer having side chains containing a carboxyl group which is reacted with an epoxy compound having one carbon-carbon double bond such as glycidyl (meth)acrylate to obtain a radiation-reactive polymer.

The content of the side chains as defined herein, each having one terminal carbon-carbon double bond and a chain length of 6 or more in terms of number of atoms, and each of which can be the same or a different length, in the radiation-reactive polymer, depends on the kind of the monomer constituting the polymer. In general, the proportion of the monomer unit having such side chains in all the monomer units is from about 1 to 70 mol %, preferably from about 5 to 40 mol %, more preferably from about 10 to 25 mol %.

The number average molecular weight of the radiation-reactive polymer is from about 200,000 to 3,000,000, preferably from about 250,000 to 1,500,000.

The re-release adhesive according to the present invention generally contains a polymerization initiator. Such a polymerization initiator used can be a known or conventional polymerization initiator. Examples of the photopolymerization initiator to be contained in the case where curing is effected by irradiation with ultraviolet rays include $\alpha$-ketol-based compound such as 4-(2-hydroxyethoxy)phenyl(2-hydroxy-2-propyl)ketone, $\alpha$-hydroxy-$\alpha$, $\alpha'$-dimethylacetophenone, 2-methyl-2-hydroxypropiophenone and 1-hydroxycyclohexylphenylketone, acetophenone-based compound such as methoxyacetophenone, 2,2-dimethoxy-2-phenylacetophenone, 2,2-diethoxyacetophenone and 2-methyl-1-[4-(methylthio)-phenyl]-2-morpholinopropane-1, benzoinether-based compound such as benzoin ethyl ether, benzoin isopropyl ether and anisoin methyl ether, ketal-based compound such as benzyl dimethyl ketal, aromatic sulfonyl chloride-based compound such as 2-naphthalenesulfonyl chloride, optically active oxim-based compound such as 1-phenone-1,1-propanedione-2-(o-ethoxycarbonyl)oxim, benzophenone-based compound such as benzophenone, benzoilbenzoic acid and 3,3'-dimethyl-4-methoxybenzophenone, thioxanthone-based compound such as thioxanthone, 2-chlorothioxanthone, 2-methylthioxanthone, 2,4-dimethylthioxanthone, isopropylthioxanthone, 2,4-dichlorothioxanthone, 2,4-diethylthioxanthone and 2,4-diisopropylthioxanthone, campherquinone, halogenated ketone, acylphosphinoxide, and acylphosphonate. The amount of such a polymerization initiator used is from about 1 to 10 parts by weight based on 100 parts by weight of the radiation-reactive polymer.

The re-release adhesive according to the present invention may further comprise additives such as a radiation-reactive oligomer (radiation-curing oligomer) and a crosslinking agent. The radiation-reactive oligomer that can be used is appropriately selected from various oligomers such as urethane-based oligomer, polyether-based oligomer, polyester-based oligomer, polycarbonate-based oligomer and polybutadiene-based oligomer. These radiation-reactive oligomers may be used alone or in combination of two or more thereof. When a radiation-reactive polymer capable of sufficiently exhibiting characteristics, i.e., lowering adhesion, is used, these oligomers may not be necessarily used. The amount of the radiation-reactive oligomer to be used is from about 0.1 to 150 parts by weight, preferably from about 1 to 100 parts by weight, more preferably from about 5 to 60 parts by weight, per 100 parts by weight of the radiation-reactive polymer. When the amount of the radiation-reactive oligomer to be used exceeds 150 parts by weight, the viscosity of the adhesive itself is extremely lowered, causing the adhesive to flow in the adhesive layer of the adhesive sheet and hence occasionally making it impossible to maintain the form of the adhesive sheet.

The crosslinking agent that can be used is a known or conventional crosslinking agent such as epoxy-based crosslinking agent, aziridine-based crosslinking agent and isocyanate-based crosslinking agent (e.g., polyisocyanate).

In the present invention, the shrinkage force developed by curing reaction caused by irradiation with radiation is 30 MPa or less (e.g., from about 0.01 to 30 MPa), preferably 25 MPa or less (e.g., from about 0.01 to 25 MPa). When the shrinkage force exceeds 30 MPa, the adhesive layer which has been cured by irradiation with radiation causes an adherend such as wafer to warp. Further, when cured by irradiation with radiation, an adhesive sheet having such an adhesive layer exhibits a remarkably lowered flexibility (or elasticity). Thus, such an adhesive sheet, if used as an adhesive sheet for dicing semiconductor wafer, cannot be sufficiently expanded.

The shrinkage force can be adjusted by appropriately changing the kind and introduced amount of the side chain, the molecular weight of the radiation-reactive polymer and the added amount of the radiation-reactive oligomer.

The re-release adhesive sheet according to the present invention comprises a substrate film and an adhesive layer comprising the re-release adhesive of the present invention provided on one surface thereof. The adhesive sheet may be prepared by, e.g., applying an adhesive composition containing the re-release adhesive of the present invention to a substrate film, and then drying the coated material. Alternatively, the adhesive sheet may be prepared by applying an adhesive composition containing the re-release adhesive to an appropriate separator (e.g., release paper), drying the coated material to form an adhesive layer, and then transferring (moving) the adhesive layer to the substrate film.

The substrate film is not specifically limited. The substrate film used can be any conventional material. Examples of the substrate film used as a protective sheet for grinding wafer include plastic films such as polyester film (e.g., polyethylene terephthalate (PET) film, polybutylene terephthalate (PBT) film, polyethylene naphthalate film), polyolefin-based film (e.g., biaxially oriented polypropylene (OPP) film, low density polyethylene (PE) film, various soft polyolefin film) and ethylene-vinyl acetate copolymer (EVA) film, and multilayer film comprising these films. Preferred among these substrate films are PET film, multi-layer film comprising PET film and OPP film, which exert an effect of inhibiting the warpage of wafer. The substrate film used as an adhesive sheet for cutting and separating wafer includes a soft polyvinyl chloride film in addition to the above various films. The thickness of the substrate film is about 20 to 300 μm.

The adhesion of the adhesive layer can appropriately be predetermined depending on the purpose of use. For example, if used for semiconductor wafer, the adhesive sheet preferably exhibits an adhesion of 100 gf/20 mm tape width or more (as determined at ordinary temperature, a peeling angle of 180° and a peeling rate of 300 mm/min) before irradiation with radiation and 40 gf/20 mm tape width or less after irradiation with radiation.

The thickness of the adhesive layer may appropriately be determined. In practice, however, it is normally from 1 μm to 300 μm, preferably from 3 μm to 200 μm, more preferably from 5 μm to 100 μm.

The shape of the adhesive sheet is not specifically limited but may appropriately be determined depending on the purpose of use. For example, if used for grinding wafer, an adhesive sheet which has been cut in the same shape as wafer is preferably used.

The re-release adhesive sheet according to the present invention can be used as a protective sheet for protecting the surface of semiconductor wafer at the back grinding step for grinding the back surface of semiconductor wafer among the various semiconductor preparation steps. The adhesive sheet according to the present invention comprises an adhesive layer formed by an adhesive comprising as a main component a radiation-reactive polymer having a specific side chain structure and showing a shrinkage force falling within a specified range when cured by irradiation with radiation. Thus, when the adhesive sheet which has been adhered on one surface of a semiconductor wafer the other surface of which is then ground is irradiated with radiation such as ultraviolet rays, the adhesive layer of the adhesive sheet is cured to show a lowered adhesion, making it easy to peel the adhesive sheet off from the wafer. In general, when irradiated with radiation, the adhesive layer undergoes volume shrinkage to produce a shrinkage force resulting in the warpage of the wafer. However, the adhesive sheet according to the present invention exhibits a lowered shrinkage force and thus causes little warpage of the wafer even when cured by irradiation with radiation.

The re-release adhesive sheet according to the present invention can also be used as a dicing adhesive tape for adhering to the other side of a semiconductor wafer to fix the wager at the pick-up dicing step of automatically collecting chips obtained by cutting and separating a semiconductor wafer. In the case where the adhesive sheet according to the present invention is used for such a purpose, when the adhesive sheet is irradiated with radiation after the cutting of the wafer, the adhesive layer is cured to exhibit a lowered adhesion but shows an extremely small shrinkage force and maintains an appropriate flexibility. Thus, the adhesive sheet can be sufficiently expanded, making it possible to secure a desired dicing street. Accordingly, semiconductor chips can be smoothly picked up.

In accordance with the present invention, the adhesion can be sufficiently lowered by curing reaction caused by irradiation with radiation. At the same time, the warpage of the adherend by the shrinkage force developed by the curing reaction can be reduced to a low level. Further, the adhesive sheet according to the present invention which has been cured can be maintained flexible to an extent such that it can be somewhat expanded.

The present invention will be further described in the following examples, but the present invention should not be construed as being limited thereto. The conditions under which the wafer is ground on the other surface thereof, the conditions of irradiation with ultraviolet rays (UV), the conditions of expansion, etc., are as follows.

(Conditions of Wafer Grinding)
    Grinding machine: DFG-840, produced by Disco Inc.
    Wafer: 6-inch dia. (Back surface was ground such that the thickness was reduced from 600 μm to 100 μm)
    Wafer laminating machine: DR-8500II (produced by Nitto Seiki K.K.)
    Ultraviolet (UV) radiator: NEL UM-110 (produced by Nitto Seiki K.K.)
    Integrated dose of ultraviolet rays: 500 mJ/cm$^2$ (Measurement of Warpage of Wafer)
    For the evaluation of the warpage of the wafer thus ground and irradiated with UV the wafer thus ground was placed on a flat place with a protective sheet adhered thereon. The distance (mm) between the end of the wafer and the flat place was then determined.

(Wafer Dicing Conditions)

Dicing machine: DFD2S/8 (produced by Disco Inc.)
    Dicing rate: 100 mm/sec.
    Dicing blade: 2050HFDD (produced by Disco Inc.)
    Rotary speed of dicing blade: 40,000 rpm
    Cutting depth of dicing tape: 30 μm
    Size of wafer chip: 10 mm × 10 mm
    Wafer diameter: 6 inch (Expanding Conditions)

Dicing ring: 2-6-1 (produced by Disco Inc.; inner diameter: 19.5 cm)

Drawdown: 10 mm

Die bonder: CPS-100 (produced by NEC Kikai K.K.)

(Measurement of Gap Between Chips)

The width of the kerf (dicing street) between chips developed by expanding the adhesive sheet thus diced was measured.

(Adhesion)

Measured according to JIS Z 0237.

(Shrinkage Force)

Determined according to the method mentioned above (see FIG. 1).

EXAMPLE 1

A blend composition comprising 0.59 mols of ethyl acrylate, 0.59 mols of butyl acrylate and 0.26 mols of 2-hydroxyethyl acrylate was copolymerized in a toluene solution to obtain an acrylic copolymer having a number average molecular weight of 300,000. Subsequently, the copolymer thus obtained was addition reacted with 0.21 mols of 2-methacrylolyloxyethyl isocyanate to introduce a terminal carbon-carbon double bond into each side chain in the polymer molecule. The resulting side chains each had a length of 13 in terms of number of atoms. Subsequently, 100 parts by weight of the polymer thus obtained were mixed with 1 part by weight of a polyisocyanate-based crosslinking agent as described below and 3 parts by weight of an acetophenone-based photopolymerization initiator as described below to prepare an adhesive composition. The polyisocyanate-based crosslinking agent used was an adduct of trimethylolpropane and toluidine diisocynanate, sold by Nippon Polyurethane Industry Co., Ltd. under the trade name COLONATE L, and having the following formula:

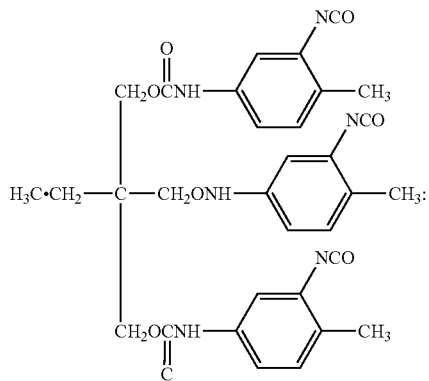

The acetophenone-based photopolymerization inhibitor used is 2,2-dimethoxy-1,2-diphenylethan-1-one, sold by Ciba Specialty Chemicals under the trade name IRGACURE 651, and having the following formula:

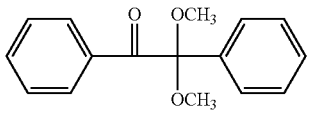

The adhesive composition thus prepared was applied to a release-treated film to form an adhesive layer having a thickness of 30 μm. The adhesive layer thus formed was irradiated with ultraviolet rays at a dose of 500 mJ/cm², and then measured for shrinkage force.

On the other hand, the adhesive composition was applied to one surface of a polyester substrate film having a thickness of 50 μm to form an adhesive layer having a thickness of 30 μm. Thus, an adhesive sheet for grinding wafer was obtained. The adhesive sheet thus obtained was laminated with a wafer which was then ground under the above-described conditions. The laminate was irradiated with ultraviolet rays under the above-described conditions, and then measured for warpage of wafer. The adhesive sheet was also measured for adhesion of adhesive layer with respect to SUS304 steel plate before and after irradiation with ultraviolet rays.

EXAMPLE 2

A blend composition comprising 0.59 mols of ethyl acrylate, 0.59 mols of butyl acrylate and 0.26 mols of 6-hydroxyhexyl acrylate was copolymerized in a toluene solution to obtain an acrylic copolymerized polymer having a number average molecular weight of 320,000. Subsequently, the copolymer thus obtained was addition reacted with 0.21 mols of 2-methacryolyloxyethyl isocyanate to introduce a terminal carbon-carbon double bond into each side chain in the polymer molecule. The resulting side chains each had a length of 17 in terms of number of atoms. The subsequent procedures were the same as in Example 1.

EXAMPLE 3

A blend composition comprising 0.59 mols of ethyl acrylate, 0.59 mols of butyl acrylate and 0.26 mols of 2-hydroxyethyl acrylate was copolymerized in a toluene solution to obtain an acrylic copolymerized polymer having a number average molecular weight of 300,000. Subsequently, the copolymer thus obtained was addition reacted with 0.21 mols of 2-methacryolyl isocyanate to introduce a terminal carbon-carbon double bond into each side chain in the polymer molecule. The resulting side chains each had a length of 10 in terms of number of atoms. The subsequent procedures were the same as in Example 1.

EXAMPLE 4

A blend composition comprising 0.59 mols of ethyl acrylate, 0.59 mols of butyl acrylate and 0.26 mols of acrylic acid was copolymerized in a toluene solution to obtain an acrylic copolymerized polymer having a number average molecular weight of 300,000. Subsequently, the copolymer thus obtained was addition reacted with 0.21 mols of glycidyl methacrylate to introduce a terminal carbon-carbon double bond into each side chain in the polymer molecule. The resulting side chains each had a length of 9 in terms of number of atoms.

Subsequently, 100 parts by weight of the polymer thus obtained were mixed with 0.1 parts by weight of an epoxy-based crosslinking agent as described below and 3 parts by weight of the same acetophenone-based photopolymerization initiator used in Example 1 to prepare an adhesive composition. The subsequent procedures were the same as in Example 1. The epoxy-based crosslinking agent used was 1,3-bis(N,N-diglycidylaminomethyl)cyclohexane, sold by Mitsubishi Gas Chemical Co., Inc. under the trade name TETRAD C, and having the following formula:

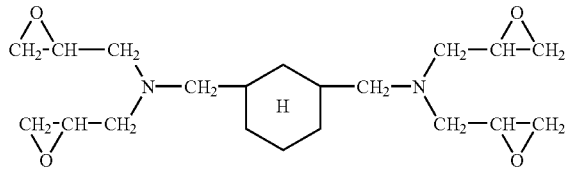

EXAMPLE 5

A blend composition comprising 0.59 mols of ethyl acrylate, 0.59 mols of butyl acrylate and 0.26 mols of vinyl acetate was copolymerized in a toluene solution to obtain an acrylic copolymer having a number average molecular weight of 300,000. The copolymer thus obtained was then saponified by an ordinary method to obtain a polymer having the acetyloxy group substituted by hydroxyl group. The polymer was reacted with 0.21 mols of methacryolyl isocyanate to introduce a terminal carbon-carbon double bond into each side chain in the polymer molecule. The resulting side chains each had a length of 6 in terms of number of atoms. The subsequent procedures were the same as in Example 1.

EXAMPLE 6

100 Parts by weight of the radiation-reactive polymer (polymer having a terminal carbon-carbon double bond introduced into each side chain) obtained in Example 1 were mixed with 1 part by weight of the same polyisocyanate-based crosslinking agent used in Example 1, 3 parts by weight of the acetophenone-based photopolymerization initiator used in Example 1, and 30 parts by weight of a radiation-curing bifunctional urethane acrylate (product name=UV-3000B, manufactured by Nippon Synthetic Chemical Industry Co., Ltd., having a weight average molecular weight of 18,000) to prepare an adhesive composition. The subsequent procedures were the same as in Example 1.

EXAMPLE 7

The procedure of Example 1 was followed except that a soft vinyl chloride film (thickness: 50 μm) was used instead of polyester substrate film to obtain an adhesive sheet for wafer dicing. The adhesive sheet thus obtained was laminated with a wafer, subjected to dicing and expansion under the above-described conditions, and then measured for width of dicing street.

COMPARATIVE EXAMPLE 1

A blend composition comprising 0.59 mols of ethyl acrylate, 0.59 mols of butyl acrylate and 0.26 mols of vinyl acetate was copolymerized in a toluene solution to obtain an acrylic copolymer having a number average molecular weight of 300,000. The copolymer thus obtained was then saponified by an ordinary method to obtain a polymer having the acetyloxy group substituted by hydroxyl group. 0.21 mols of acrylic acid were added to the polymer thus obtained. The polymer was then subjected to condensation reaction in the presence of an acid catalyst to introduce a terminal carbon-carbon double bond into each side chain in the polymer molecule. The resulting side chains each had a length of 4 in terms of number of atoms. The subsequent procedures were the same as in Example 1.

COMPARATIVE EXAMPLE 2

A blend composition comprising 0.59 mols of ethyl acrylate, 0.59 mols of butyl acrylate and 0.26 mols of 2-hydroxyethyl acrylate was copolymerized in a toluene solution to obtain an acrylic copolymerized polymer having a number average molecular weight of 300,000. Subsequently, the copolymer thus obtained was mixed with 1 part by weight of the polyisocyanate-based crosslinking agent used in Example 1, 3 parts by weight of the acetophenone-based photopolymerization initiator used in Example 1 and 30 parts by weight of the radiation-curing bifunctional urethane acrylate used in Example 6 to prepare an adhesive composition. The subsequent procedures were the same as in Example 1.

COMPARATIVE EXAMPLE 3

An adhesive composition was prepared in the same manner as in Comparative Example 2 except that the amount of the radiation-curing bifunctional urethane acrylate added was 100 parts by weight. The subsequent procedures were the same as in Comparative Example 2.

COMPARATIVE EXAMPLE 4

The procedure of Comparative Example 3 was followed except that a soft vinyl chloride film (thickness: 50 μm) was used instead of polyester substrate film to obtain an adhesive sheet for wafer dicing. The adhesive sheet thus obtained was laminated with a wafer, subjected to dicing and expansion under the above-described conditions, and then measured for width of dicing street.

The results obtained in the Examples and Comparative Examples are shown in the Table below.

TABLE

| Example No. | Shrinkage force of adhesive layer (MPa) | Warpage of wafer (mm) | | Adhesion (gf/25 mm) | | Distance between dicing streets (μm) |
| | | Shortly after grinding | After irradiation with UV | Shortly before irradiation with UV | After irradiation with UV | |
|---|---|---|---|---|---|---|
| Example 1 | 3 | 1.9 | 2.2 | 530 | 10 | — |
| Example 2 | 1 | 1.9 | 2.1 | 600 | 8 | — |

TABLE-continued

| Example No. | Shrinkage force of adhesive layer (MPa) | Warpage of wafer (mm) | | Adhesion (gf/25 mm) | | Distance between dicing streets (μm) |
| --- | --- | --- | --- | --- | --- | --- |
| | | Shortly after grinding | After irradiation with UV | Shortly before irradiation with UV | After irradiation with UV | |
| Example 3 | 4 | 1.9 | 2.2 | 550 | 8 | — |
| Example 4 | 8 | 2.0 | 2.3 | 720 | 9 | — |
| Example 5 | 13 | 1.9 | 2.1 | 820 | 10 | — |
| Example 6 | 5 | 1.9 | 2.3 | 590 | 8 | — |
| Example 7 | 3 | — | — | 500 | 8 | 200 |
| Comparative Example 1 | 32 | 1.9 | 4.5 | 450 | 9 | — |
| Comparative Example 2 | 4 | 2.0 | 2.2 | 1,000 | 350 | — |
| Comparative Example 3 | 35 | 1.9 | 4.3 | 700 | 9 | — |
| Comparative Example 4 | 35 | — | — | 630 | 8 | 75 |

As can be seen from the above Table, when irradiated with ultraviolet rays, Examples 1 to 6 show a drop of adhesion to an extent great enough for re-release and a shrinkage force as small as 30 MPa or less as developed by curing, causing the wafer to be little warped. On the contrary, when cured by irradiation with ultraviolet rays, Comparative Examples 1 and 3 show a shrinkage force of more than 30 MPa, causing the wafer to be drastically warped when irradiated with ultraviolet rays. As shown in Comparative Example 2, when the shrinkage force of an adhesive comprising a polymer free of a terminal carbon-carbon double bond in its molecule and a radiation-reactive oligomer in combination is lowered by reducing the content of the radiation-reactive oligomer, the warpage of the wafer can be reduced, but the adhesion cannot be sufficiently lowered even when irradiated with ultraviolet rays.

Further, when irradiated with ultraviolet rays, Example 7 shows a sufficient drop of adhesion. Moreover, the adhesive layer is maintained flexible even when cured by irradiation with ultraviolet rays. Thus, when the adhesive sheet of Example 7 is expanded, the width of the dicing street can be expanded to an extent such that chips can be smoothly picked up. On the contrary, when irradiated with ultraviolet rays, Comparative Example 4 shows a sufficient drop of adhesion. However, when the adhesive sheet of Comparative Example 4 is expanded, the width of the dicing street is too small to pick up chips smoothly.

Thus, Comparative Examples 1 and 3 show that where re-release property (low adhesive force) is made important, shrinkage force becomes high, and Comparative Example 2 shows that where low shrinkage force is made important, release force becomes high. If an adhesive is limited to have a shrinkage force of 30 MPa or less, the re-release property which should be possessed by an adhesive may not be exhibited. For this reason, the present invention uses a radiation-curable polymer and further defines the side chains, limiting the number of unsaturated groups present to the terminal carbon-carbon group in each side chain, in order to exhibit the desired re-release property while preventing warpage. Further, by defining the polymers in this manner, re-release properties can be maintained, and an oligomer component may be blended with the polymer in an amount within a range such that a shrinkage force of an adhesive does not exceed 30 MPa. The type of oligomer is not particularly limited so long as the physical properties of an adhesive are satisfied.

While the invention has been described in detail and with reference to specific embodiments thereof, it will be apparent to one skilled in the art that various changes and modifications can be made therein without departing from the spirit and scope thereof.

What is claimed is:

1. A curable re-release adhesive comprising (1) a radiation-reactive polymer comprising a main chain and a plurality of intramolecular side chains, each side chain having a terminal carbon-carbon double bond, a chain length of 13 or more in terms of number of atoms, and the same or a different number of atoms as each other side chain in the polymer; and (2) a radiation-reactive oligomer in an amount of 0.1 to 150 parts by weight per 100 parts by weight of said radiation-reactive polymer; and said re-release adhesive having a shrinkage force of 3 MPa or less as developed upon curing with radiation, wherein said side chains are introduced into the radiation-reactive polymer by a method comprising copolymerizing a monomer containing a reactive functional group (a) with a comonomer to synthesize a polymer having the functional group (a) in its side chains, and then reacting the polymer having the functional group (a) with a compound having a functional group (b) that is reactive with the functional group (a) and one carbon-carbon double bond while maintaining the carbon-carbon double bond, such that the terminal carbon-carbon double bond of each side chain of the radiation-reactive polymer is the only carbon-carbon double bond of each side chain, wherein the functional group (a) is —OH and functional group (b) is —N=C=O, wherein the compound having the functional group (b) is 2-methacryloyloxyethyl isocyanate, and wherein the proportion of the monomer unit having a terminal carbon-carbon double bond and a chain length of 13 or more in terms of number of atoms in all monomer units is from 5 to 40 mol %.

2. The curable re-release adhesive according to claim 1, wherein each side chain has the same number of atoms as each other side chain in the polymer.

3. The curable release adhesive according to claim 1, wherein the proportion of the monomer unit having a terminal carbon-carbon double bond and a chain length of 13 or more in terms of number of atoms in all monomer units is from 5 to 25 mol %.

4. A re-release adhesive sheet comprising a substrate film and an adhesive layer comprising a curable re-release adhesive provided on one surface of the substrate film, said re-release adhesive comprising (1) radiation-reactive polymer comprising a main chain and a plurality of intramolecular side chains, each side chain having a terminal carbon-carbon double bond, a chain length of 13 or more in terms of number of atoms, and the same or a different number of atoms as each other side chain in the polymer and (2) a radiation-reactive oligomer in an amount of 0.1 to 150 parts by weight per 100 parts by weight of said radiation-reactive polymer; and said re-release adhesive having a shrinkage force of 3 MPa or less as developed upon curing with radiation, wherein said side chains are introduced into the radiation-reactive polymer by a method comprising copolymerizing a monomer containing a reactive functional group (a) with a comonomer to synthesize a polymer having the functional group (a) in its side chains, and then reacting the polymer having the functional group (a) with a compound having a functional group (b) that is reactive with the functional group (a) and one carbon-carbon double bond while maintaining the carbon-carbon double bond, such that the terminal carbon-carbon double bond of each side chain of the radiation-reactive polymer is the only carbon-carbon double bond of each side chain, wherein the functional group (a) is —OH and functional group (b) is —N=C=O, wherein the compound having the functional group (b) is 2-methacryloyloxyethyl isocyanate, and wherein the proportion of the monomer unit having a terminal carbon-carbon double bond and a chain length of 13 or more in terms of number of atoms in all monomer units is from 5 to 40 mol %.

5. The re-release adhesive sheet according to claim 4, wherein the proportion of the monomer unit having a terminal carbon-carbon double bond and a chain length of 13 or more in terms of number of atoms in all monomer units is from 5 to 25 mol %.

* * * * *